United States Patent
Harrison et al.

(10) Patent No.: US 7,100,364 B2
(45) Date of Patent: Sep. 5, 2006

(54) OPEN LOOP FUEL CONTROLLER

(75) Inventors: Clive Harrison, Chelmsford (GB); Garon Nigel Heslop, Essex (GB); Jon Dixon, Maldon (GB); Mark Paul Guerrier, Gravesend (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 509 days.

(21) Appl. No.: 10/633,117

(22) Filed: Aug. 1, 2003

(65) Prior Publication Data

US 2004/0107696 A1 Jun. 10, 2004

(30) Foreign Application Priority Data

Jul. 29, 2002 (GB) .................................. 0217422.5

(51) Int. Cl.
*F01N 3/00* (2006.01)
(52) U.S. Cl. .............................. 60/285; 60/274; 60/276; 60/299
(58) Field of Classification Search .................. 60/274, 60/276, 285, 299
See application file for complete search history.

(56) References Cited

U.S. PATENT DOCUMENTS

| | | | | |
|---|---|---|---|---|
| 5,282,360 A | * | 2/1994 | Hamburg et al. | 60/274 |
| 5,842,340 A | * | 12/1998 | Bush et al. | 60/274 |
| 5,901,552 A | * | 5/1999 | Schnaibel et al. | 60/274 |
| 6,497,093 B1 | * | 12/2002 | Lewis et al. | 60/277 |

* cited by examiner

*Primary Examiner*—Thomas Denion
*Assistant Examiner*—Diem Tran
(74) *Attorney, Agent, or Firm*—Brinks Hofer Gilson & Lione

(57) ABSTRACT

This invention relates to an apparatus for controlling the air-fuel ratio demanded by a fuel controller in order to maintain optimum performance of a catalytic converter. Provided is an open loop fuel controller comprising a detector arranged down stream of a catalyst for detecting rich breakthrough; a catalyst model having an estimator for estimating a stored oxygen level in the catalyst; a comparator for comparing an estimated stored oxygen level with a plurality of predetermined thresholds; demand adjusting means for adjusting an air fuel ratio demand in dependence upon a received signal from said comparator and upon a received signal from said detector. A method of open loop fuel control is also provided.

8 Claims, 5 Drawing Sheets

OPEN LOOP FUEL CONTROLLER

CLAIM OF PRIORITY

This application claims priority to United Kingdom application number GB 0217422.5, which was filed on Jul. 29, 2002.

BACKGROUND

1. Field of Invention

This invention relates to a method and apparatus for controlling the air-fuel ratio demanded by a fuel controller in order to maintain optimum performance of a catalytic converter where there is no feed back between the achieved air fuel ration and the desired air fuel ratio.

2. Related Art

Three way catalytic converters are used to reduce exhaust emission of nitrous oxides ($NO_x$) hydrocarbon (HC) and carbon monoxide (CO). In a steady state of operation the performance of the catalyst in removing these pollutants is at an optimum level when the air fuel ratio of the exhaust gas is within a narrow range, close to the stoichiometric air-fuel ratio.

Conventionally, a fuel controller is used to control the air fuel ratio demand from an engine based on feedback from an air fuel ratio sensor upstream of a catalytic converter in the exhaust passage or from two air fuel ratio sensors, one upstream of the catalytic converter, and one downstream of the catalytic converter. Operation based on such feedback is known as 'closed-loop' operation.

However, when it is desired to operate the engine away from the stoichiometric, as the air fuel sensors are insensitive to changes in the air fuel ratio other than around the stoichiometric air fuel ratio, there is no feed back correction relating to the air-fuel ratio actually achieved. Such operation is known as 'open-loop' operation.

For example, after throttle opening it may be desirable to operate on the rich side of a stoichiometric air fuel ratio in order to provide extra torque. Another example is after deceleration fuel shut off it may be desirable to operate on the rich side of a stoichiometric air fuel ration in order to regenerate the catalyst.

The problem therefore is that when an engine is operating away from stoichiometric it is in open loop operation and any error between the requested air fuel ratio and the achieved air fuel ratio is not corrected.

The object of this invention is to provide a method and apparatus for correcting air fuel errors when in open-loop operation when the engine is operating with a substantially different air fuel ratio to that which is stoichiometric.

SUMMARY OF THE INVENTION

According to the present invention there is provided an open loop air fuel ratio controller comprising a detector arranged down stream of a catalyst for detecting rich breakthrough; a catalyst model having an estimator for estimating a stored oxygen level in the catalyst; a comparator for comparing an estimated stored oxygen level with a plurality of predetermined thresholds; demand adjusting means for adjusting an air fuel ratio demand in dependence upon a received signal from said comparator and upon a received signal from said detector.

This provides a means for adjusting the air fuel ratio by using the estimated stored oxygen level as well as an indication of whether rich breakthrough has yet occurred.

It is advantageous if the controller further comprises model adjusting means for adjusting the model in dependence upon a received signal from said comparator and upon a received signal from said detector so that the model may also be adjusted, for example if characteristics of the catalyst change due to ageing.

If the comparator is arranged to compare an estimated stored oxygen level with a plurality of thresholds when the detector detects rich breakthrough, then different actions may be taken in dependence upon the estimated stored oxygen level falling within various ranges.

Preferably either the model is adjusted or the air fuel ration demand is adjusted in particular circumstances, but not both. Therefore preferably the controller is arranged such that when the model adjusting means adjusts the model, the demand adjusting means does not adjust the air fuel ratio demand. Furthermore, the controller is arranged such that when the demand adjusting means adjusts the air fuel ratio demand, the model adjusting means does not adjust the model.

In a preferred embodiment the model adjusting means is arranged to adjust the model to reduce or increase a maximum oxygen storage value and the detector is a heated exhaust gas oxygen sensor.

According to another aspect of the invention there is also provided a method of open loop fuel control comprising the steps of detecting rich breakthrough downstream of a catalyst; estimating an oxygen storage level in the catalyst; comparing the estimated oxygen storage level with a plurality of predetermined thresholds; and adjusting the air fuel ratio demand in dependence upon the results of said comparing step and said detecting step.

It is an advantage if the method further comprises the step of adjusting the model in dependence upon the results of said comparing step and said detecting step.

Preferably, if the estimated oxygen storage level is less than a first predetermined threshold then the air fuel ratio demand is adjusted in a rich direction.

In a preferred embodiment there is a range of values within which the estimated oxygen storage level is expected to fall when a rich breakthrough is detected, and therefore no action is taken. Accordingly in this embodiment the model adjusting step and the air fuel ratio demand adjusting step are not performed if a rich breakthrough is detected and if the estimated oxygen level is greater than a second predetermined threshold and less than a third predetermined threshold.

Preferably adjusting the air fuel ratio demand comprises the sub-step of determining whether the estimated oxygen storage level is greater than a fourth predetermined threshold when a rich breakthrough is detected, if so then the air fuel ratio demand is adjusted in a lean direction.

Preferably the model adjusting step is arranged to adjust the model such that a maximum value for the oxygen storage level is increased if a rich breakthrough is detected and if the estimated oxygen level is between the first predetermined threshold and the second predetermined threshold.

It follows that, preferably the model adjusting step is also arranged to adjust the model such that a maximum value for the oxygen storage level is decreased if a rich breakthrough is detected and if the estimated oxygen level between the third predetermined threshold and the fourth predetermined threshold.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
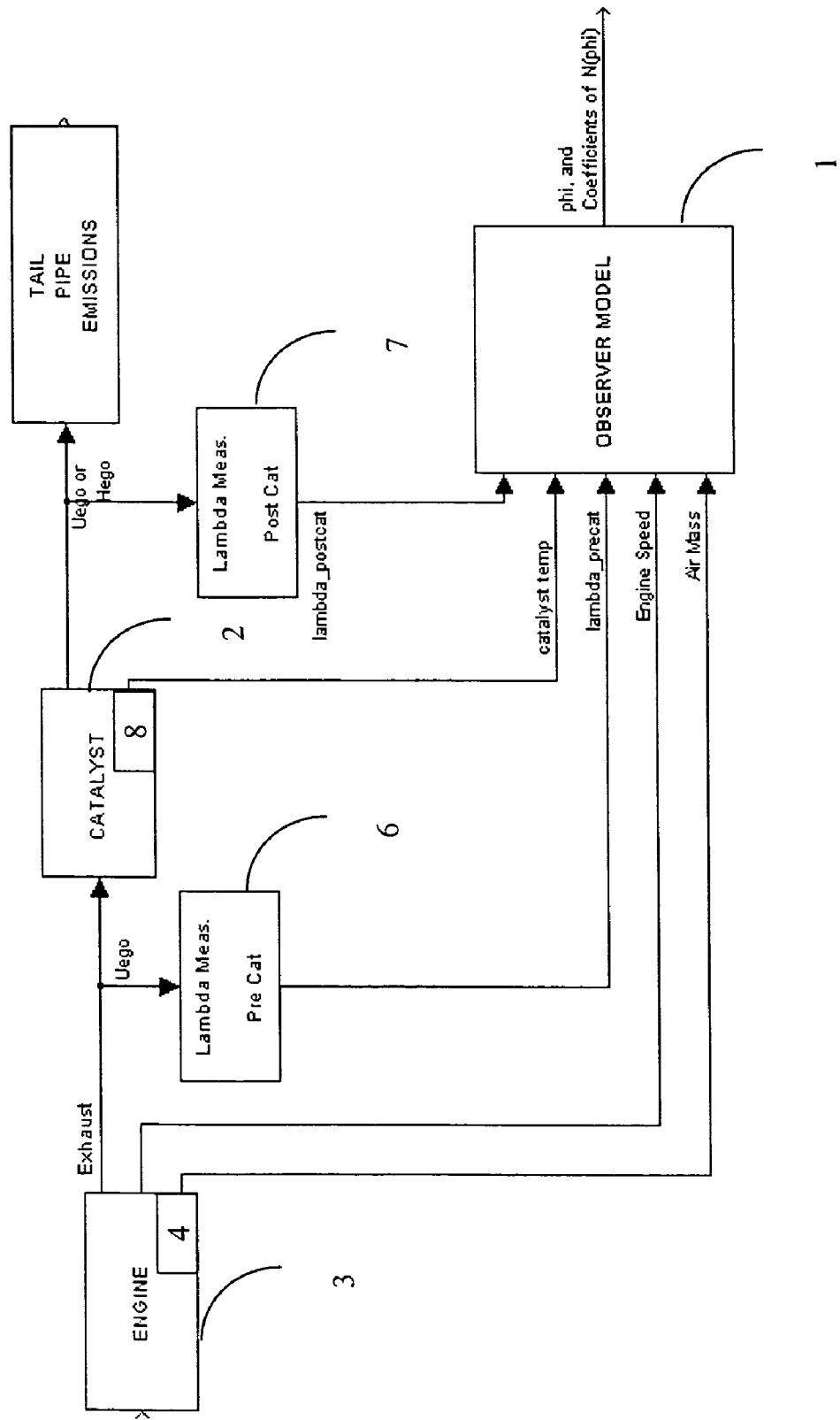
FIG. 1 is a block diagram illustrating use of a catalyst observer model.

Referring now to FIG. 1, an observer model 1 of a catalyst 2 will be described. An air flow sensor 4 mounted in an intake pipe of an engine 3 is used to measure air mass flow induced by the engine 3. In other embodiments of the invention the air mass flow may be estimated from other parameters, for example manifold pressure, engine speed and air temperature.

Exhaust gases from the engine 3 are fed to the catalyst 2 mounted in an exhaust pipe. A sensor 7 measures the air fuel ratio downstream of the catalyst 2. The sensor 7 may be a Universal Exhaust Gas Oxygen (UEGO) sensor or may be a Heated Exhaust Gas Oxygen (HEGO) sensor. A HEGO sensor senses whether the air-fuel ratio is rich or lean of stoichiometric, whereas a UEGO sensor provides a measurement of the air fuel ratio. A sensor 8 measures the temperature of the catalyst 2. The catalyst 2 does not perform well at low temperatures so the model 1 has the measured catalyst temperature as an input, and does not operate until the temperature of the catalyst reaches a minimum temperature. In other embodiments the catalyst temperature may be estimated using a catalyst model.

The observer model 1 operates as will now be described, although the invention is not limited to use of this particular model, and simpler or more complex catalyst models could be utilized.

Oxygen storage of the catalyst is represented by an oxygen storage variable $\phi$ which is equal to zero when the catalyst is in a neutral state, is negative if the catalyst is depleted of oxygen and is positive if the catalyst is oxygen rich. It is possible to measure the air fuel ratio upstream of the catalyst 2 by use of a UEGO. However, use of a UEGO is costly, and even a UEGO has a limited range around stoichiometric within which the air fuel ratio measurement is accurate. Therefore the model 1 used assumes that the precatalyst air fuel ratio $\lambda_{precat}$ is equal to the air fuel ratio demanded by a control system (not shown). Therefore, the model 1 has as an input an air fuel ratio demand which is received from the control system.

The rate of change of the oxygen storage variable $\phi$ is estimated according to the following equation.

$$d\phi/dt = (\Delta\lambda_{precat} - N(\phi)S_{wv}) * \text{oxygen\_mass}/\lambda_{precat}$$

$\Delta\lambda_{precat}$ is equal to $\lambda_{precat} - 1$, therefore $\Delta\lambda_{precat}$ is negative if the air fuel ratio is rich of stoichiometric, and $\Delta\lambda_{precat}$ is positive if the air fuel ratio is lean of stoichiometric. The air mass flow measured at the sensor 4 is multiplied by a constant value 0.21 which is equal to the fraction of air by mass which is oxygen, this fraction is denoted oxygen_mass in the above equation.

Figure 2:
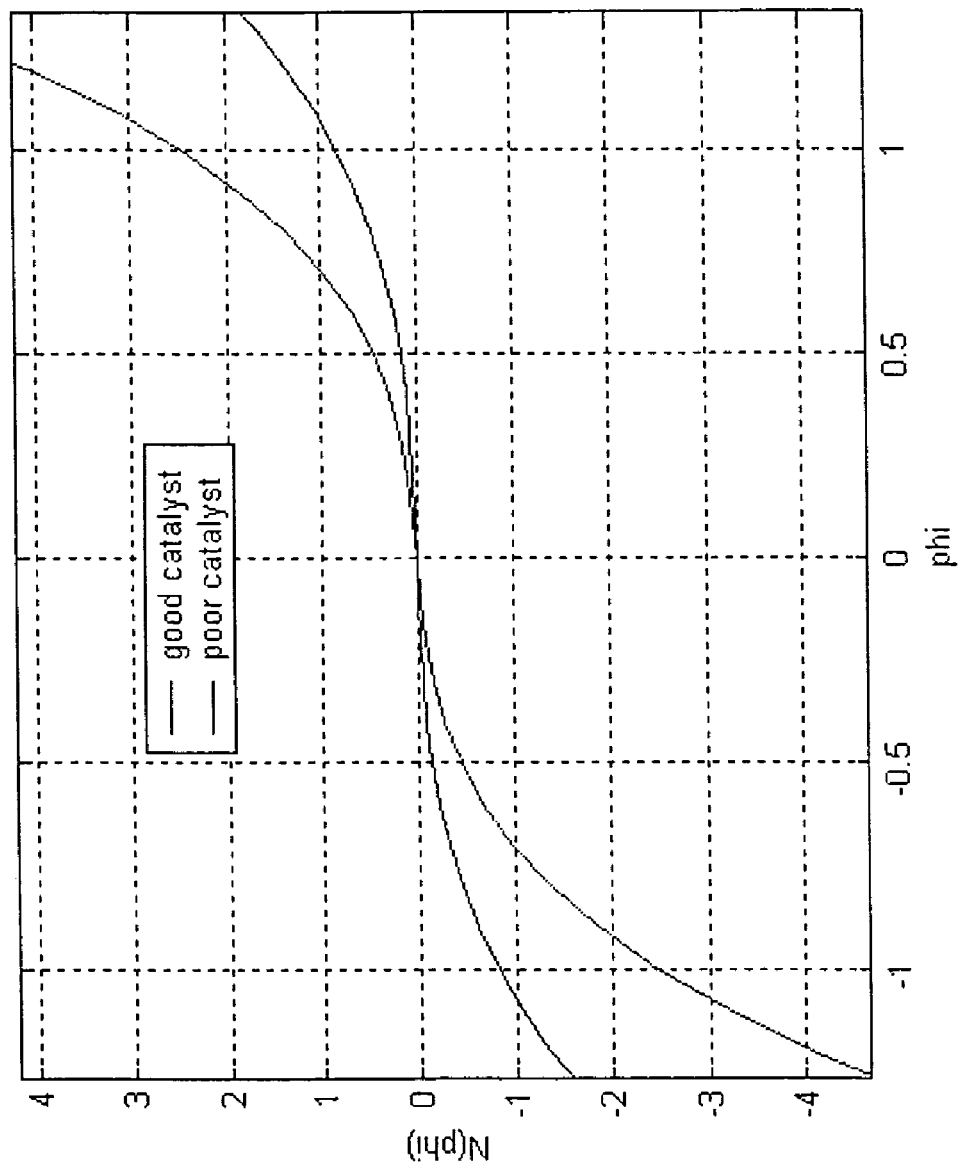
FIG. 2 is a graph showing the difference in operation between a new catalyst, and one which has deteriorated.

$N(\phi) = \Sigma a_i \phi^i$ and represents the resistance to oxygen storage of the catalyst for a particular value of $\phi$ as illustrated in FIG. 2.

$S_{wv}$ is equal to 0 when $\Delta\lambda_{precat}$ is negative (i.e. the air fuel ratio is rich of stoichiometric) and $\phi$ is greater than 0 (i.e. there is excess oxygen stored in the catalyst).

It will be understood that when a rich air fuel ratio is supplied to the engine 3, and when there is excess oxygen stored in the catalyst 2, then the engine 3 emits gaseous components which can be oxidized by the catalyst 2, and in this case $S_{wv}$ is equal to 0 so that $$d\phi/dt = \Delta\lambda_{precat} * \text{oxygen\_mass}/\lambda_{precat}$$

However, when a lean air fuel ratio is supplied to the engine 3 or when the catalyst 2 is depleted of oxygen then $S_{wv}$ is equal to 1 so that $$d\phi/dt = (\Delta\lambda_{precat} - N(\phi)) * \text{oxygen\_mass}/\lambda_{precat}$$

so in this case $d\phi/dt$ is reduced by an amount equal to $N(\phi) * \text{oxygen\_mass}/\lambda_{precat}$ when compared to the previous case.

$$Est(\lambda_{postcat}) = N(\phi) S_{wv} + 1$$

$\lambda_{postcat}$ is the downstream air fuel ratio divided by the stoichiometric air fuel ratio. $\phi$ is calculated by integrating the above differential equation, and then $N(\phi)$ is calculated. When $S_{wv} = 0$ then $Est(\lambda_{postcat}) = 1$, otherwise $Est(\lambda_{postcat}) = N(\phi) + 1$.

$Est(\lambda_{postcat})$ and the measured $\lambda_{postcat}$ may be compared if the sensor 7 is a UEGO, and the difference between them may be used to update the coefficients $a_i$ of the oxygen storage characteristic curve $N(\phi)$ and the $\phi$ value itself so that the model 1 more accurately represents the performance of the catalyst 2. The coefficients $a_i$ may be updated using a Kalman filter, a description of which may be found in "Applied Optimal Estimation", Gelb, the MIT press 1974. If the sensor 7 is a HEGO then it is only possible to determine whether $\lambda_{postcat}$ is rich or lean of stoichiometric, and hence it is only possible to decide whether to increase or reduce the maximum level of $\phi$, which may be regarded as the oxygen saturation level.

FIG. 2 illustrates the differing $N(\phi)$ curves for a good catalyst compared with a deteriorated catalyst.

After the engine has been operating at a particular air fuel ratio for some time, then the oxygen stored in the catalyst will stabilize at a value which depends upon the operating air-fuel ratio, thus $d\phi/dt = 0$ and $$\Delta\lambda_{precat} = \Delta\lambda_{postcat}$$

Figure 3:
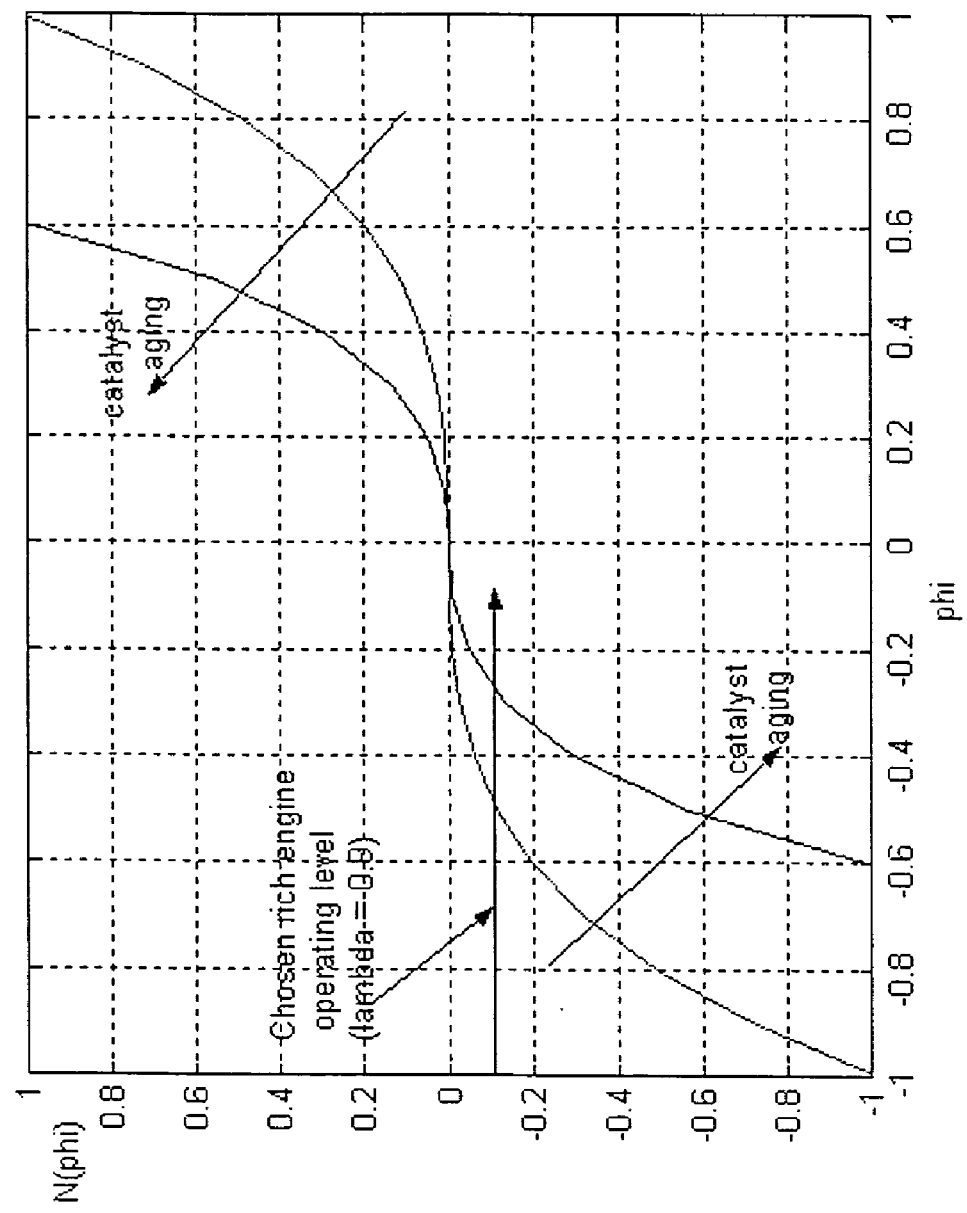
FIG. 3 is a graph showing how catalyst characteristics change with age of the catalyst.

FIG. 3 illustrates an example oxygen storage characteristic curve showing the oxygen storage value when $\Delta\lambda_{precat} = \Delta\lambda_{postcat} = 0.1$ and when $\Delta\lambda_{precat} = \Delta\lambda_{postcat} = -0.1$. FIG. 3 illustrates how an oxygen storage characteristic curve may change for a deteriorated catalyst. The difference in the steady state oxygen storage value is illustrated for $\Delta = _{precat} = \Delta\lambda_{postcat} = -0.1$ for two examples of oxygen storage characteristic curves. Hence it will be appreciated that if fuel control is implemented using air fuel ratio thresholds measured at the sensor 7, then as the catalyst deteriorates, the fuel control scheme will allow breakthrough of $NO_x$ when the catalyst resists absorption of any more oxygen, and breakthrough of HC and CO when the catalyst is depleted of oxygen.

It is known to update a catalyst model by detecting unexpected breakthroughs. In particular the model parameters are adjusted such that the maximum level of oxygen storage is adjusted to accommodate aging properties of the catalyst.

However, unexpected breakthrough may also occur when $\lambda_{precat}$ does not accurately reflect lambda-demand. As explained earlier, use of a wide ranging precatalyst UEGO is not practical so adjusting the lambda demand using feedback is not possible. This invention addresses the problem of open loop fuel control together with updating of a catalyst model as the catalyst characteristics change.

The catalyst characteristics are only likely to change slowly over time, therefore any difference between Est ($\lambda_{postcat}$) and the measured $\lambda_{postcat}$ due to catalyst ageing is likely to be within a small range. In this invention it is assumed that differences within a small range are due to catalyst aging and that larger differences are due to errors in the open loop control (i.e. due to differences between lambda-demand and $\lambda_{precat}$). The difference between Est ($\lambda_{postcat}$) and the measured $\lambda_{postcat}$ is estimated by monitoring $\phi$ as predicted by the model 1 and detecting rich breakthrough using the sensor 7.

If the catalyst is in a neutral state then we expect $\phi$ to be equal to 0. If $\phi$ is less than 0 then we expect rich breakthrough to occur and if $\phi$ is greater than 0 then we do not expect rich breakthrough to occur (although lean breakthrough might then occur resulting in $NO_x$ emissions)

Figure 4:
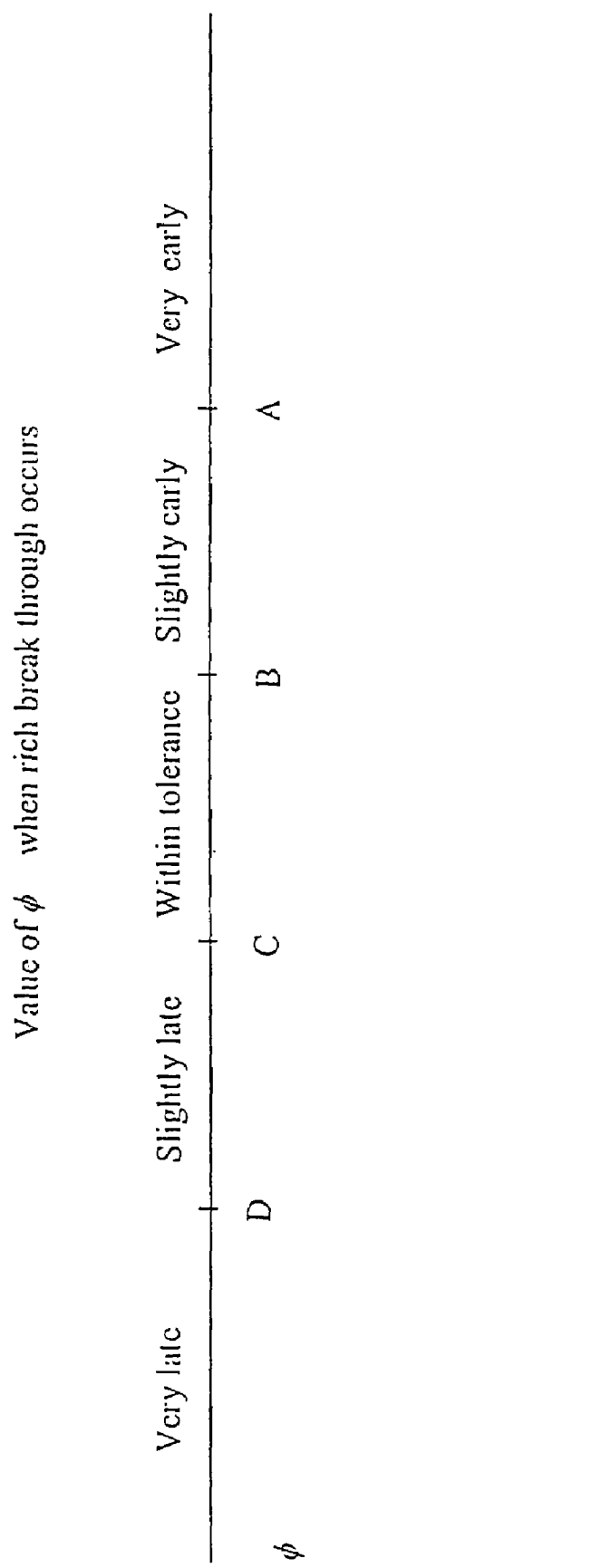
FIG. 4 illustrates a range of estimated oxygen storage values with predetermined thresholds indicated therein.

However, to allow for some tolerance a range may be defined, within which is it expected that $\phi$ will fall when rich break through occurs. FIG. 4 illustrates a range of $\phi$ values with predetermined thresholds A, B, C and D indicated therein.

When rich breakthrough is detected the current value of $\phi$ estimated by the model 1 is used to determine what if any action is to be taken. A first predetermined threshold D is defined, and if $\phi$ falls below this threshold then rich breakthrough is considered to have occurred very late and the open loop fuel control is adjusted accordingly. A second predetermined threshold C is defined and if $\phi$ is between the first predetermined threshold D and the second predetermined threshold C then rich breakthrough is considered to have occurred late enough for the model to need to be updated. A third predetermined threshold B is defined and if $\phi$ falls between the second predetermined threshold C and the third predetermined threshold B when rich breakthrough occurs then this is considered to be within normal limits. Finally a fourth predetermined threshold A is defined and if $\phi$ is between the third predetermined threshold B and the fourth predetermined threshold A then rich break through is considered to have occurred early enough for the model to need to be updated. If $\phi$ is greater than the fourth predetermined threshold A then it is considered that rich breakthrough has occurred very early and the open loop fuel control is adjusted accordingly. D<=C<=B<=A, and FIG. 4 indicates the conclusion made when $\phi$ falls within the ranges shown. It will be appreciated that C<=0<=B so that rich breakthrough is expected to occur close to $\phi$=0. Also it is worth noting that one or more thresholds may be equal to one another, so for example the tolerance range C-B could be set to be equal to 0. Finally it is worth noting that if no rich break through is detected and $\phi$ is less than the first predetermined threshold D then rich breakthrough is considered to have occurred very late and the open loop fuel control is adjusted accordingly.

Figure 5:
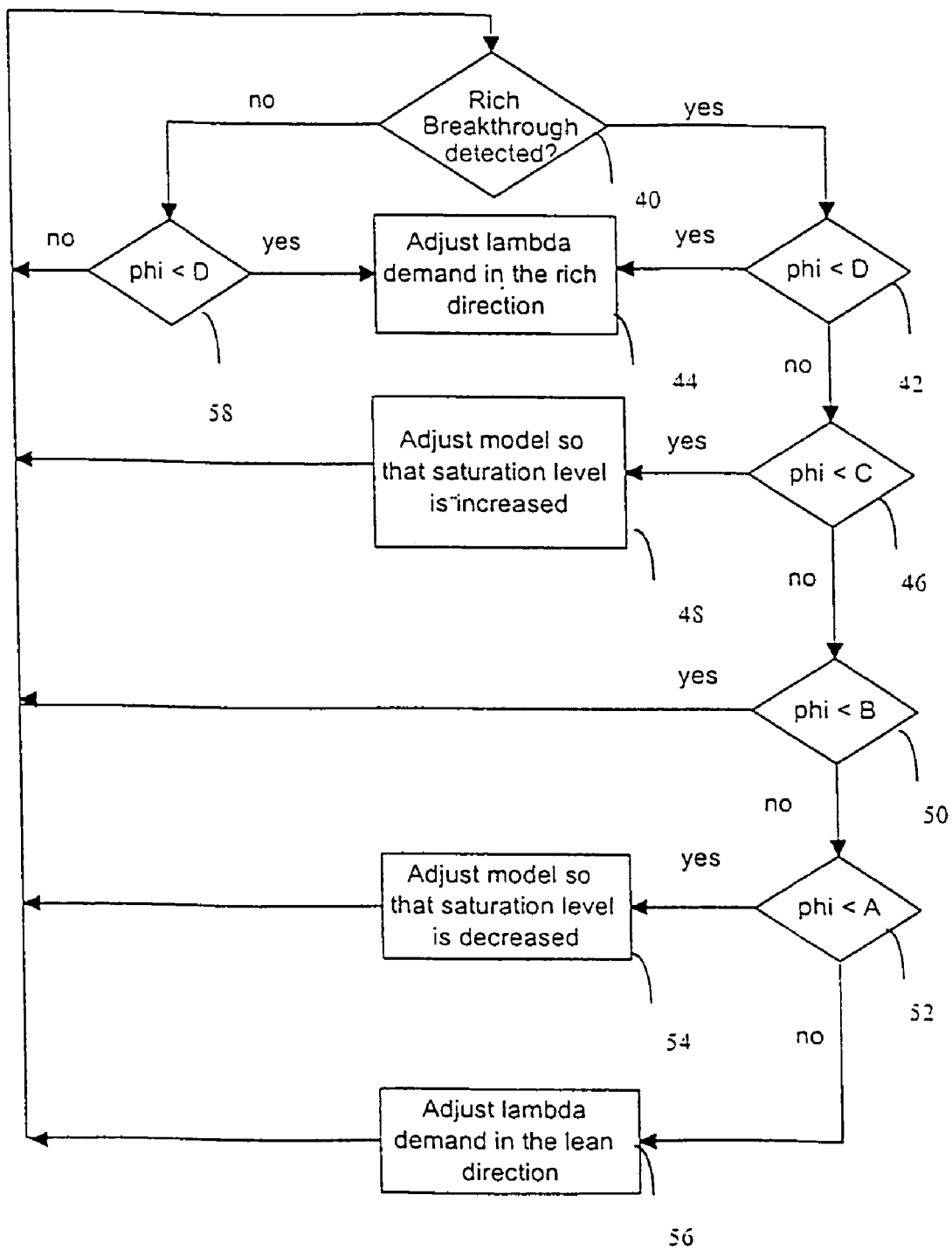
FIG. 5 is a flow chart showing the method steps carried out in an open loop fuel controller of the present invention.

FIG. 5 illustrates the steps taken by an open loop fuel controller according to one embodiment of the present invention.

If rich breakthrough is detected at the sensor 7 at step 40, then $\phi$ is compared to the first predetermined threshold D at step 42. If $\phi$ is less than D then rich breakthrough has occurred very much later than the model 1 predicts. Therefore it is assumed that the error is due to a difference between the lambda demand and the achieved lambda (i.e. $\lambda_{precat}$). In this case at step 44 the lambda demand is adjusted to become richer. If $\phi$ is not less than D at step 42 then $\phi$ is compared to the second predetermined threshold C at step 46. If $\phi$ is less than C it is assumed that the error is due to a change in the catalyst characteristics and the catalyst model is adjusted so that the saturation level is increased at step 48.

If $\phi$ is not less than C at step 46 then $\phi$ is compared to the third predetermined threshold B at step 50. If $\phi$ is less than B it is considered that rich break trough has occurred within expected range of $\phi$ and no action is taken. However, if $\phi$ is not less than B at step 50 then $\phi$ is compared to the first predetermined threshold A at step 52.

If $\phi$ is less than A it is assumed that the error is due to a change in the catalyst characteristics and the catalyst model is adjusted so that the saturation level is decreased at step 54.

If $\phi$ is not less than A then rich breakthrough has occurred very much earlier than the model 1 predicts. Therefore it is assumed that the error is due to a difference between the lambda demand and the achieved lambda (i.e. $\lambda_{precat}$). In this case at step 56 the lambda demand is adjusted to become leaner.

Lambda demand may be adjusted by means of a data table, which is updated according to the value of $\phi$ at step 56 or 44 as appropriate, and which is added to the lambda demand as determined by a conventional open loop fuel controller.

If rich breakthrough is not detected at step 40, then at step 58 $\phi$ is compared to the first predetermined threshold D. If $\phi$ is less than D then rich breakthrough has occurred very much later than the model 1 predicts. Therefore it is assumed that the error is due to a difference between the lambda demand and the achieved lambda (i.e. $\lambda_{precat}$) In this case at step 44 the lambda demand is adjusted to become richer.

It is intended that the foregoing detailed description be regarded as illustrative rather than limiting and that it be understood that it is the following claims, which are intended to define the scope of the invention.

The invention claimed is:

1. An open loop fuel control method comprising the steps of:
   detecting rich breakthrough downstream of a catalyst;
   estimating an oxygen storage level in the catalyst with a model;
   comparing the estimated oxygen storage level with a plurality of predetermined thresholds;
   adjusting an air fuel ratio demand in dependence upon the results of said comparing step and said detecting step, the fuel ratio demand being adjusted in a rich direction if the estimated oxygen storage level is less than a first predetermined threshold; and
   adjusting the model in the estimating step in dependence upon the results of said comparing step and said detecting step, the adjusting to the estimating step and the adjusting to the air fuel ratio demand step not being performed if a rich breakthrough is detected and if the estimated oxygen level is greater than a second predetermined threshold end is less than a third predetermined threshold.

2. An open loop fuel control method according to claim 1 wherein the first predetermined threshold is less than or equal to the second predetermined threshold and the second predetermined threshold is less than or equal to the third predetermined threshold.

3. An open loop fuel control method according to claim 1, in which adjusting the air fuel ratio demand comprises the sub-step of:

if a rich breakthrough is detected and the estimated oxygen storage level is greater than a fourth predetermined threshold then the air fuel ratio demand is adjusting in a lean direction.

4. An open loop fuel control method according to claim 3 wherein the first predetermined threshold is less than or equal to the second predetermined threshold and the second predetermined threshold is less than or equal to the third predetermined threshold and the third predetermined threshold is less than or equal to the fourth predetermined threshold.

5. An open loop fuel control method according to claim 1, in which the model adjusting step is arranged to adjust the model such that a maximum value for the oxygen storage level is increased it a rich breakthrough is detected and if the estimated oxygen level is greater than a first predetermined threshold and less than a second predetermined threshold.

6. An open loop fuel control method according to claim 5, in which the model adjusting step is arranged to adjust the model such that a maximum value for the oxygen storage level is decreased if a rich breakthrough is detected and if the estimated oxygen level is greater man a third predetermined threshold and less than a fourth predetermined threshold.

7. An open loop fuel control method according to claim 3 wherein the first predetermined threshold is less than or equal to the second predetermined threshold and the second predetermined threshold is less than or equal to the third predetermined threshold.

8. An open loop fuel control method according to claim 6 wherein the first predetermined threshold is less than or equal to the second predetermined threshold and the second predetermined threshold is less than or equal to the third predetermined threshold and the third predetermined threshold is less then or equal to the fourth predetermined threshold.

* * * * *

UNITED STATES PATENT AND TRADEMARK OFFICE
CERTIFICATE OF CORRECTION

| | | |
|---|---|---|
| PATENT NO. | : 7,100,364 B2 | Page 1 of 1 |
| APPLICATION NO. | : 10/633117 | |
| DATED | : September 5, 2006 | |
| INVENTOR(S) | : Clive Harrison et al. | |

It is certified that error appears in the above-identified patent and that said Letters Patent is hereby corrected as shown below:

Column 7, in claim 5, line 23, after "increased" delete "it" and substitute --if-- in its place.

Column 8, in claim 6, line 7, after "is greater" delete "man" and substitute --than-- in its place.

Signed and Sealed this

Nineteenth Day of December, 2006

JON W. DUDAS
*Director of the United States Patent and Trademark Office*